No. 733,943. PATENTED JULY 21, 1903.
C. J. CALEY.
BALL BEARING KNOB SHANK.
APPLICATION FILED APR. 25, 1903.
NO MODEL.

Witnesses
James P. Duhamel
R. S. Allyn

Inventor
Charles J. Caley
By his Attorney

No. 733,943. Patented July 21, 1903.

UNITED STATES PATENT OFFICE.

CHARLES J. CALEY, OF NEW BRITAIN, CONNECTICUT, ASSIGNOR TO RUSSELL & ERWIN MANUFACTURING COMPANY, OF NEW BRITAIN, CONNECTICUT, A CORPORATION OF CONNECTICUT.

BALL-BEARING KNOB-SHANK.

SPECIFICATION forming part of Letters Patent No. 733,943, dated July 21, 1903.

Application filed April 25, 1903. Serial No. 154,237. (No model.)

*To all whom it may concern:*

Be it known that I, CHARLES J. CALEY, a citizen of the United States, residing at New Britain, Hartford county, Connecticut, have invented certain new and useful Improvements in Ball-Bearing Knob-Shanks, of which the following is a full, clear, and exact description.

This invention relates to improvements in door locks and latches, and particularly to a bearing for a knob-shank.

The object of my invention is mainly to improve the construction of a bearing for the knob-shank having in view economy of construction, freedom of action, and durability.

Figure 1:
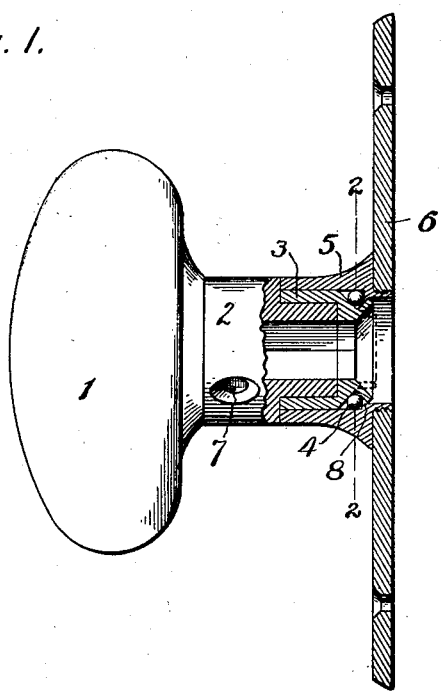
Figure 2:
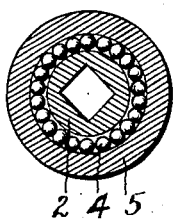

In the accompanying drawings, Figure 1 is a side elevation of a door-knob, the shank and the bearing therefor being shown in section. Fig. 2 is a section on the plane of the line 2 2, Fig. 1.

1 is a door-knob. 2 is the shank thereof, the end of which is reduced in size and is preferably provided with a bushing 3, which in practice should also be of lesser diameter than the full diameter of the knob-shank 2. This bushing 3 is still further reduced or tapered at its free end to form a seat for antifriction-balls 4.

5 is a thimble, which may be made of substantially the diameter of the knob-shank, may be counterbored to receive the bushing 3 and to form an annular shoulder 8, against which the antifriction-balls 4 may bear. In the particular form shown the part 5 is technically known as a "thimble" and is usually secured to a suitable plate 6, arranged to be secured to the outside of the door or the like. A rose-plate is, however, an equivalent of the thimble.

In assembling the parts it should be observed that the extreme end of the bushing 3, as shown in dotted lines, Fig. 1, is first made substantially cylindrical. This is to facilitate the introduction of the balls. The bushing 3 may be inserted within the thimble 5, and then the antifriction-balls 4 may be introduced, and finally the end of the sleeve, which is when employed in reality a part of the knob-shank, may be expanded or spun out into the form shown in solid lines, Fig. 1, and the balls securely retained thereby.

The knob-shank is adapted to receive the usual spindle, by which the lock or latch is operated, and said knob-shank may be secured on said spindle in any of the well-known ways—for example, by means of a screw which may pass through a screw-passage 7 in said shank. In the particular form shown the annular shoulder 8 in the thimble 5 may be extended slightly, (see Fig. 1,) so that when the end of the bushing 3 is spun outwardly it may overstand the inner side of said shoulder to prevent the knob-shank from becoming accidentally separated from the supporting-thimble. This, however, is not absolutely essential, since the spindle would hold the knob-shank in place when all of the parts are assembled.

It will be observed that the balls 4 not only take the thrust of the knob, but also any tilting or twist thereof. Hence friction is reduced to the minimum, and it requires but a very light spring within the lock to return the knob to its idle position. In constructions heretofore it frequently happens that the resistance to the turning of the knob is such that it will cramp or bind and hold the latch in the withdrawn position. By my invention this is practically impossible.

What I claim is—

1. An improvement in locks and latches comprising, a knob-shank, a tubular support therefor, said knob-shank being reduced in diameter toward its end and extending into and taking a bearing in said support, and antifriction devices arranged and held between the end of said knob-shank and said support to take the thrust thereof.

2. An improvement in locks and latches comprising, a knob-shank, a tubular support therefor, said knob-shank being reduced in diameter toward its end and extending into and taking a bearing in said support, and antifriction devices arranged within said support and held between the same and the end of said knob-shank to take the thrust thereof.

3. An improvement in locks and latches comprising, a knob-shank, a tubular support therefor, said shank, projecting into and taking a bearing in said support, a bushing between said shank and said support and antifriction devices arranged and held between the end of said bushing and said support to take the thrust of said knob.

4. An improvement in locks and latches comprising, a knob-shank, a tubular support therefor, the end of said shank projecting into and taking a bearing in said support, a shoulder within said support and a shoulder on the end of said knob-shank, and a series of antifriction-balls arranged between said shoulders and held within said support to take the thrust of said knob.

5. An improvement in locks and latches comprising, a knob-shank, a support therefor, the end of said knob-shank projecting into said support, a shoulder on said support, a shoulder on said knob-shank, antifriction-balls arranged between said shoulders and within said support, the inner end of said shank being expanded or turned outwardly to engage inside of the shoulder on said support and hold the parts against detachment.

Signed at New Britain, Connecticut, this 23d day of April, 1903.

CHAS. J. CALEY.

Witnesses:
M. S. WIARD,
W. E. WIGHTMAN.